US00RE33918E

United States Patent [19]

Simpson

[11] E Patent Number: Re. 33,918

[45] Reissued Date of Patent: May 12, 1992

[54] IRONING BOARD

[75] Inventor: Danny Simpson, Seymour, Ind.

[73] Assignee: Lear Siegler Seymour Corp., Seymour, Ind.

[21] Appl. No.: 349,525

[22] Filed: May 9, 1989

Related U.S. Patent Documents

Reissue of:

[64] Patent No.: 4,769,894
Issued: Sep. 13, 1988
Appl. No.: 140,601
Filed: Jan. 4, 1988

U.S. Applications:

[62] Division of Ser. No. 944,957, Dec. 22, 1986, Pat. No. 4,759,296.

[51] Int. Cl.[5] ..... B23P 11/00

[52] U.S. Cl. ..... 29/437; 29/434; 38/103; 108/119; 228/173.3; 228/173.6

[58] Field of Search ..... 29/434, 436, 437, 469; 72/348, 379; 38/103, DIG. 1, DIG. 2, DIG. 3; 108/119, 121, 122, 123; 228/173.3, 173.6

[56] References Cited

U.S. PATENT DOCUMENTS

| | | | |
|---|---|---|---|
| 442,507 | 12/1890 | Benton | 38/108 |
| 606,210 | 6/1898 | Harriman | 108/135 |
| 930,491 | 8/1909 | Peterman | 108/31 |
| 982,093 | 1/1911 | Russ | 108/138 |
| 1,558,268 | 3/1924 | Mast | 403/274 X |
| 1,583,233 | 1/1925 | Leon | 403/274 X |
| 1,635,311 | 10/1926 | Corrigan | 72/348 |
| 1,723,796 | 8/1929 | Magnuson | 38/137 |
| 2,078,587 | 8/1936 | Sadenwater | 38/114 |
| 2,235,883 | 3/1941 | John | 108/123 X |
| 2,276,981 | 3/1941 | John | 38/137 |
| 2,313,135 | 3/1943 | Fay | 38/137 |
| 2,406,050 | 10/1944 | Tronic | 38/137 |
| 2,424,734 | 11/1943 | Booth | 38/137 |
| 2,451,249 | 10/1948 | Tronic | 38/114 |
| 2,603,012 | 9/1949 | Geddes et al. | 38/139 |
| 2,617,213 | 8/1951 | Smith | 38/138 |
| 2,718,077 | 5/1953 | Grissette | 38/138 |
| 2,748,512 | 1/1953 | Kulicke, Jr. | 103/117 |
| 2,864,187 | 11/1956 | Radliff | 38/115 |
| 2,913,839 | 11/1959 | Ashby | 108/117 |
| 2,974,431 | 3/1961 | Ribaudo | 108/117 |
| 2,994,144 | 8/1961 | Pavlo | 38/107 |
| 3,045,373 | 7/1959 | Olswang | 38/137 |
| 3,049,825 | 8/1960 | Boyd | 38/112 |
| 3,062,262 | 11/1962 | Post | 72/403 |
| 3,147,721 | 9/1964 | Holmes | 72/348 |
| 3,147,722 | 9/1964 | Williamson | 72/348 |
| 3,152,561 | 10/1964 | Munson et al. | 108/117 |
| 3,203,373 | 3/1964 | King | 108/138 |
| 3,288,090 | 8/1965 | King | 108/138 |
| 3,483,954 | 6/1967 | Michalski | 38/139 |
| 3,818,850 | 6/1974 | Berthet | 72/348 |
| 3,844,154 | 10/1974 | Bozek | 72/348 X |
| 4,051,707 | 10/1977 | Valek et al. | 72/348 |
| 4,512,172 | 4/1985 | Abbott et al. | 72/348 X |
| 4,567,746 | 2/1986 | Bachmann et al. | 72/348 |
| 4,574,608 | 3/1986 | Bulso, Jr. et al. | 72/348 |
| 4,713,958 | 12/1987 | Bulso, Jr. et al. | 72/348 |
| 4,715,208 | 12/1987 | Bulso, Jr. et al. | 72/348 |

FOREIGN PATENT DOCUMENTS

| | | | |
|---|---|---|---|
| 1276320 | 10/1961 | France | 108/117 |
| 801104 | 9/1958 | United Kingdom | 108/132 |

*Primary Examiner*—Mark Rosenbaum
*Assistant Examiner*—Frances Chin
*Attorney, Agent, or Firm*—Reising, Ethington, Barnard, Perry & Milton

[57] ABSTRACT

An adjustable ironing table (10) includes a top board (12) and collapsible legs (22,24). A housing (46) has a vertical wall (48) extending perpendicularly relative to the top board (12) and a horizontal wall (50). The vertical wall (48) includes an opening (52) for guiding a control element (36) through the housing (46). The horizontal wall (50) includes a slot (54). A plate (44) extends through the slot (54). A compression spring (42) is retained by the control element (36) between the vertical wall (48) and the plate (44), the spring (42) pivoting the plate (44) relative to the slot (54) to engage the control element (36). The top board (12) includes a peripheral flange (20) having an outwardly curled periphery (78). The top board (12) further includes a flat stretched portions (16) extending along the length of the top board (12). One of the legs (22) is connected by a base member (92) to guide rails (74), the base member (92) having four point containment of the guide rails (74). The present invention further provides a method of making the ironing board (10).

9 Claims, 5 Drawing Sheets

Fig-7
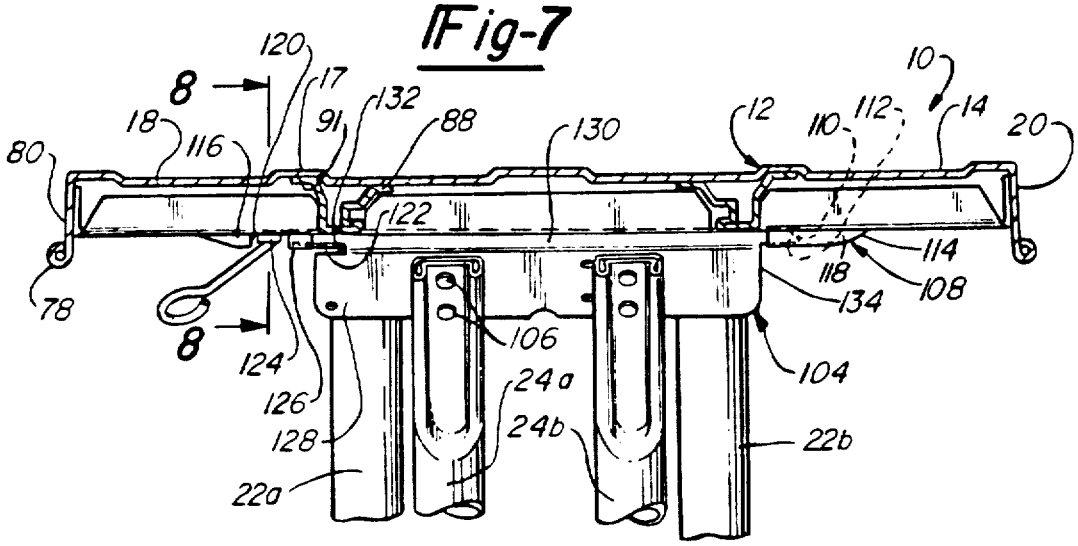
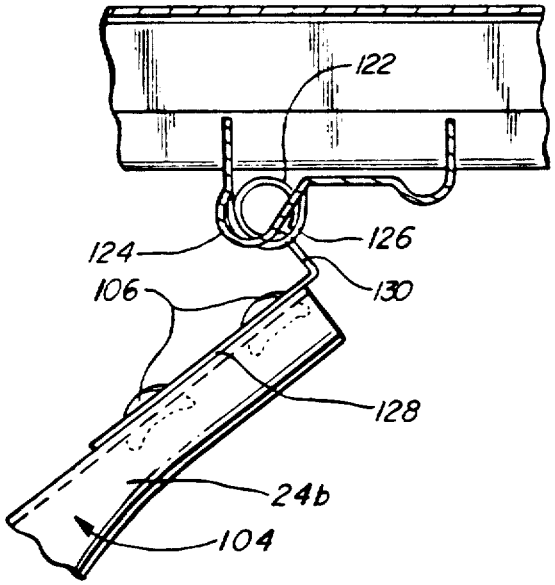
Fig-8
Fig-9
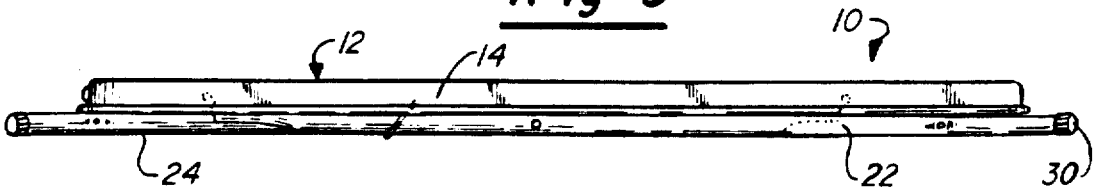

Fig-10
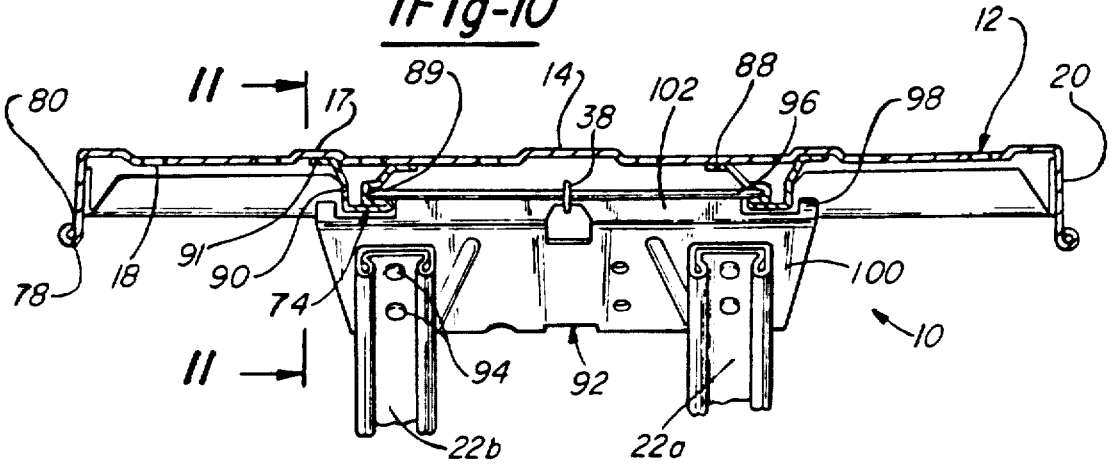
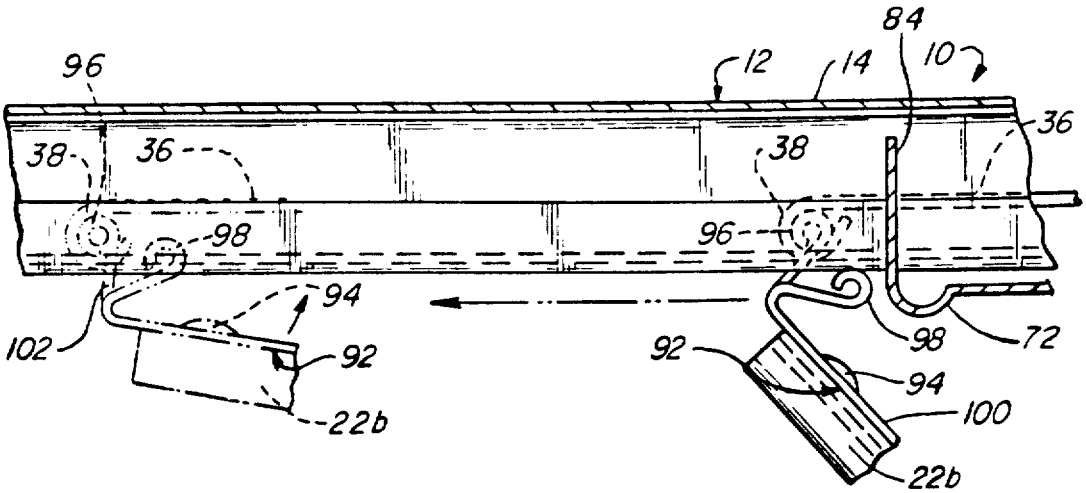
Fig-11

IRONING BOARD

Matter enclosed in heavy brackets [ ] appears in the original patent but forms no part of this reissue specification; matter printed in italics indicates the additions made by reissue.

[This is a division, of application Ser. No. 944,957, filed on Dec. 22, 1986] *This application is a Reissue of U.S. Pat. No. 4,769,894 issued Sept. 13, 1988 which was a divisional of Ser. No. 944,957 filed Dec. 22, 1986 which issued Jul. 26, 1988 as U.S. Pat. No. 4,759,296.*

TECHNICAL FIELD

This invention relates to ironing boards or tables of adjustable height, and more particularly, the construction of the locking mechanism, hinging of the legs, and fabrication of the top board portion of the table.

BACKGROUND ART

Ironing boards generally include a pair of legs pivotally connected together along their length, each of the legs being operatively connected to a top board. Either one or both of the legs are in sliding engagement with the board.

As shown in the U.S. Pat. No. 2,974,431 to Ribando issued Mar. 14, 1961, ironing boards usually have guide rails or tracks upon which either one or both of the legs glide. The guide tracks are commonly welded to the top board. Problems arise when the top board is made from coil stock. The coil stock has areas of slack material that show high and low spots of differing sizes. The present invention provides a process and top board made by such a process whereby the guide rails are effectively welded to the top board, as the top board does not have the high and low spots on the lines where the guide rails are welded.

Ironing boards generally include a locking mechanism for locking the legs in any one of a plurality of positions between a collapsed position and an open position. The U.S. Pat. No. 2,913,839 to Ashby, issued Nov. 24, 1959, shows a locking mechanism wherein a sliding leg is connected to a guide rod. A spring biases a locking plate against the guide rod to lock the guide rod and attached leg in any one of several positions. The assignee of the present application has manufactured a similar locking mechanism wherein a substantially L-shaped member is connected to the top board and the guide rod extends through an opening in the member. A locking plate is biased by a spring disposed between the locking plate and a vertical wall of the the L-shaped member so that the locking plate engages the guide rod. The present invention provides an alternative structure requiring less assembling steps than the prior art. The structure of the present invention substantially encloses the locking mechanism. Further, the L-shaped bracket of the prior art mechanism tended to bend with use thereby decreasing the pressure on the actuating spring. The release mechanism would force the locking plate against the biasing spring. The spring would then apply force against the vertical wall of the L-shaped member. With time, this vertical wall, having no additional support, tends to bend outwardly thereby decreasing the force of the biasing spring. Eventually, there is insufficient force on the spring to bias the plate to lock the guide rod. Failure of the locking mechanism results. The present invention provides a housing for the locking mechanism which is structurally more rigid than the prior art mechanisms. The present invention further provides a housing which substantially encloses the locking mechanism. This is a preferable construction for reasons of safety as it tends to exclude one's hand from the locking mechanism.

The U.S. Pat. No. 2,313,135 to Fay, issued Mar. 9, 1943, shows a fabricated ironing board having a flange extending downwardly from the top board and then rolled or bent completely around and under the edge of the periphery of the board. The flange is turned or curled into the board. If the board is pressed between forming dies to form the downward flange, the downward flange initially flows outwardly. The inward curl requires complicated additional forming dies to initially curve the outward curl inwardly and then finish the rolling of the flange to prevent exposed sharp edges. The present invention metal board which utilizes the natural outward flow of the metal and forms an outwardly curled edge having no exposed sharp edges.

An additional problem has been presented during shipping and handling of prior art assemblies. During shipping, prior art assemblies have a problem with the slide bar disengaging from the guide rails. This occurs when the board is subjected to a side blow during shipment. Previous slide bar assemblies were supported in two guide tracks in the guide rails. Any force from a blow to the side of the board was essentially dissipated through a single rail. The present invention provides a construction which provides for the force of a blow to be dissipated through both rails, effectively eliminating the disengagement problem.

In general, the present invention provides [a] *an* ironing board which minimizes cut hazards from bent metal, eliminates forming steps, simplifies the mechanism by reducing the required parts, and prevents disengagement of the slide bar from the guide rails during shipment.

SUMMARY OF THE INVENTION

An adjustable ironing table includes a top board and first and second legs movable between a collapsed position adjacent the top board and an open position extending from the top board. An elongated control element is connected to the first leg and slideably connected to the top board. Locking means allows passive movement of the control element in a direction towards the second leg and locks the control element at a fixed position against movement away from the second leg. Biasing means biases the locking means to engage the control element. Housing means has a vertical wall extending perpendicularly relative to the top of the board and a horizontal wall parallel to and spaced from the top board and extending from the vertical wall towards the first leg. The vertical wall includes guide means for guiding the control element through the housing. The horizontal wall includes a slot and the locking means extends through the slot. The biasing means is retained by the control element between the vertical wall and the locking means as the biasing means pivots the locking means relative to the slot to engage the control element.

FIGURES IN THE DRAWINGS

Other advantages of the present invention will be readily appreciated as the same becomes better understood by reference to the following detailed description when considered in connection with the accompanying drawings wherein:

FIG. 7 is an enlarged cross sectional view taken substantially along lines 7—7 of FIG. 1;

FIG. 8 is an enlarged cross sectional view taken substantially along lines 8—8 of FIG. 7;

FIG. 9 is a side view of the ironing board having its legs in the collapsed position;

FIG. 10 is an enlarged cross sectional view taken substantially along lines 10—10 of FIG. 1;

FIG. 11 is a cross sectional view taken substantially along lines 11—11 of FIG. 10;

DETAILED DESCRIPTION OF THE INVENTIONS

Figure 1:
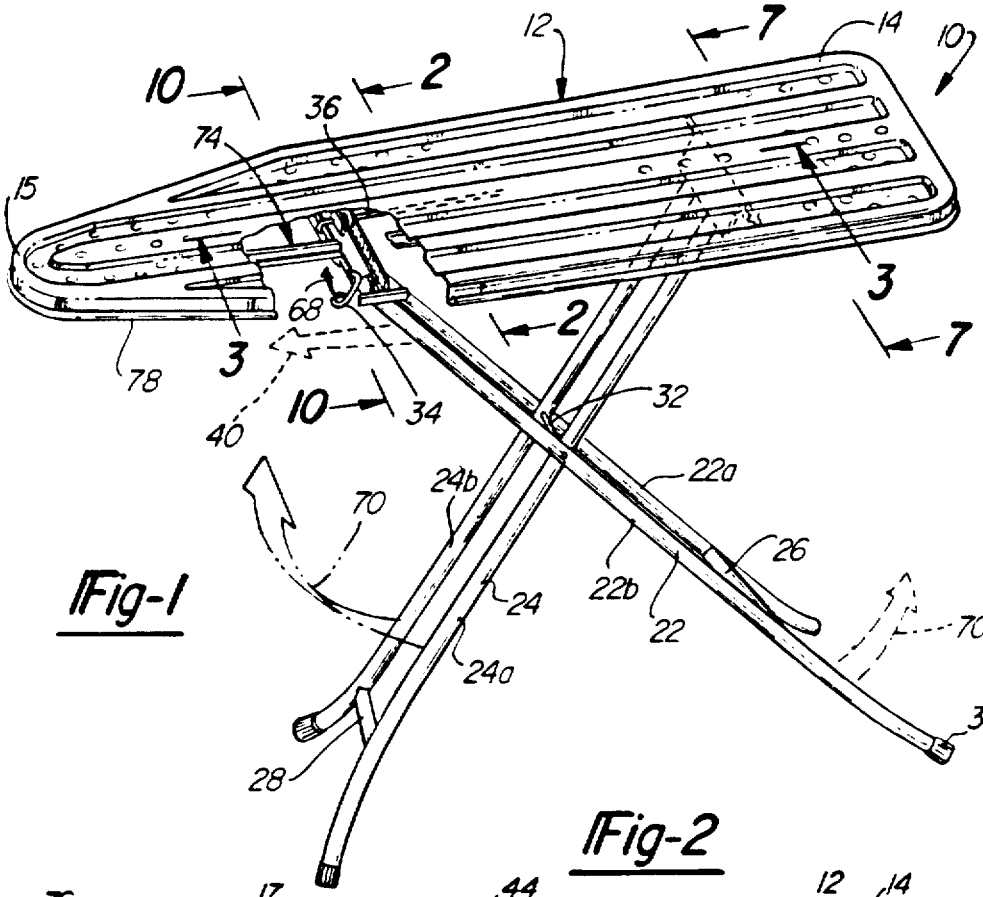
FIG. 1 is a perspective view partially broken away of an ironing board constructed in accordance with the present invention.

An adjustable table is generally shown at 10 in the Figures. The table 10 includes a top board generally indicated at 12. The top board 12 has an upper surface 14 including a plurality of embossments 16, a tapered portion 15 and a bottom surface 18. A flange 20 extends downwardly about the periphery of the top board 12.

The top board 12 is designed to provide ease for the user as far as getting clothing pulled up the tapered portion 15 of the top board 12. Specifically, the radii of of the board are smaller and the angles sharper as opposed to prior art boards.

The table 10 includes a first leg 22 and second leg 24 moveable between a collapsed position as shown in FIG. 9 wherein the legs 22 and 24 are adjacent the top board 12 and an open position wherein the legs 22 and 24 extend from the top board 12, as shown in FIG. 1. The legs 22 and 24 are adjustable so as to be retained at any extended position between those two positions shown in FIGS. 1 and 9. Each of the legs 22,24 includes reinforcing cross members 26,28. Plastic caps 30 can be mounted on each of the legs 22, 24 to prevent the ends of the legs 22, 24 from scratching a floor surface.

Each of the legs 22,24 includes two leg members 22a,22b and 24a,24b respectively. The legs 22,24 are connected together by a pin 32 which is disposed between the ends of the legs 22,24 to thereby connect the legs 22,24 for pivoting movement relative to each other.

The first leg 22 slides relative to the top board 12 whereas the second leg 24 is fixed relative to the top board 12. Both legs 22,24 pivot relative to their connection to the top board 12.

The table 10 includes a locking mechanism for locking the legs 22,24 in a position extending from the top board 12. The locking mechanism passively [allow] *allows* the legs 22,24 to move from the collapsed position to the extended position while locking the legs 22,24 from returning to the collapsed position. A release handle generally indicated at 34 is depressed to unlock the legs 22,24 and allow the legs 22,24 to fold to the collapsed position.

The table 10 includes an elongated control element 36 connected to the first leg 22 by a hooked end portion 38. The control element 36 is also slideably connected to the board 10. The locking mechanism allows for passive movement of the control element 36 in a direction towards the second leg 24 thereby allowing unrestricted extension of the legs 22,24 and locks the control element 36 at a fixed position against movement away from the second leg 24, that direction being shown by arrows 40 in FIGS. 1 and 4. Helical spring 42 biases the locking plate, generally indicated at 44, to engage the control element 36, as shown in FIG. 3.

The table 10 includes a housing generally indicated at 46 having a vertical wall 48 extending perpendicularly relative to the top board 12 and a horizontal wall 50 parallel relative to and spaced from the top board 12 and extending from the vertical wall 48 towards the first leg 22. The vertical wall 48 includes an opening 52 which provides a guide for guiding the moving control element 36 through the housing 46. The horizontal wall 50 includes a slot 54. The locking plate 44 has a lower portion 56 extending through the slot 54 and a free portion 58 above the slot 54. The free portion 58 is free to pivot about the lower portion 56 which is restrained within the slot 54.

Figure 3:
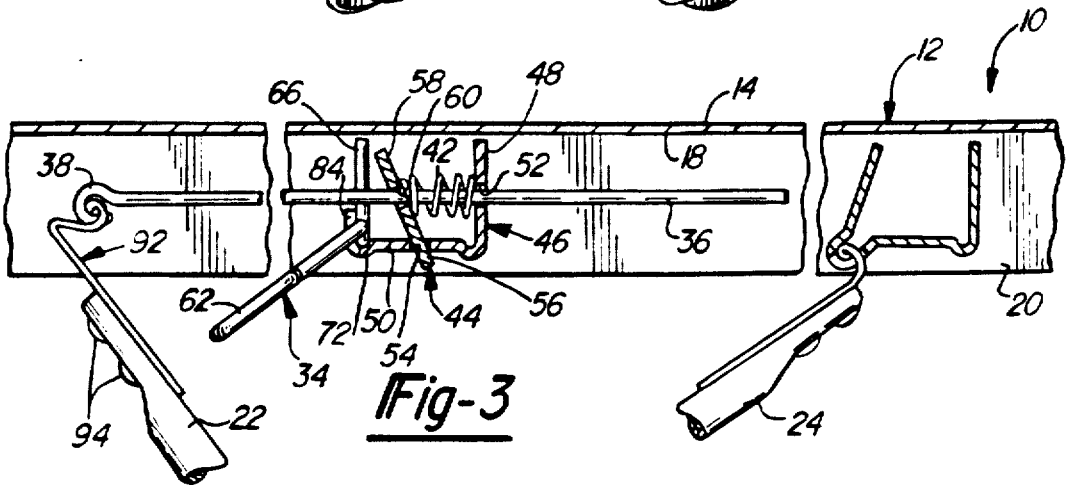
FIG. 3 is an enlarged fragmentary cross sectional view taken substantially along lines 3—3 of FIG. 1 showing the locking means in the engaged condition.

The biasing spring 42 is retained by the control element 36 between the vertical wall 48 and the locking plate 44 as the spring 42 pivots the locking plate 44 relative to the slot 54 to engage the control element 36 as shown in FIG. 3. Unlike prior art assemblies, this particular configuration of a housing enclosing the mechanism which locks the rod 36 provides a structural rigid yet structurally simple mechanism requiring fewer parts than prior art assemblies and fewer steps for constructing the assembly.

As shown in FIGS. 3 through 6, the biasing means of the table 10 is a helical compression spring 42 disposed around the control element 36 whereby the spring 42 is retained in a position between the locking plate 44 and the vertical wall 48. Manufacture of this assembly is simplified as the locking plate 44, spring 42 and housing 46 are all retained on the control element 36 and then the entire assembly is secured to the board 12 as the housing 46 is welded thereto. The entire locking assembly is secured to the board 12 in a single step. By mounting one part, the housing 46, on the assembly, the entire locking assembly is mounted on the board 12.

The opening 52 in the vertical wall 48 provides a guide for the control element 36 as it slides therethrough when the legs 22,24 are moved from one position to another. The locking plate 44 also includes an opening 60 extending therethrough. The control element 36 extends through the opening 60 in the locking plate 44. As the spring 42 forces the locking plate 44 to pivot relative to the slot 54, the locking plate 44 engages the control element 36. The control element 36 is locked as it moves in the direction of the arrows 40. However, when the control element 36 moves in the opposite direction, the locking plate 44 does not engage the control element 36. The control element 36 thereby passively moves to position the legs 22,24 in the open position.

The release means 34 moves the locking plate 44 out of engagement with the control element 36 to allow the control element 36 and first leg 22 to move away from the second leg 24 in the housing 46. The release member 34 includes a handle 62, a body portion 64 and an end portion 66. The body portion 64 is enclosed between the housing 46 and guide rails 74 mounted on the top board 12 for rotational movement. The end portion 66 engages one side of the locking plate 44 while the spring 42 engages the opposite side of the locking plate 44. Movement of the handle 62 in the direction of the arrow 68 in FIGS. 1 and 2 releases the control element 36 from the locking plate 44 allowing the legs 22 and 24 to collapse in the direction of the arrows 70 in FIG. 1. When the handle 62 is released, the spring 42 biases the locking plate 44 to return to the engaged position, as shown in FIG. 3.

The housing 46 includes a recessed portion 72 which defines a channel. The body portion 64 of the release means 34 is contained within the channel and against the guide rails 74.

The table 10 includes a pair of guide rails generally indicated *at* 74 mounted on the under surface 18 of the top board 12. The first leg 22 is operatively connected between the guide rails 74 defining a path of movement of the first leg 22. The body portion 64 of the release means 34 is contained within the channel in the housing 46 and against one of the guide rails 74 thereby spacing the handle 62 of the release means 34 from the under surface 18 of the top board 12. Even though the handle 62 is spaced from the under surface 18, the handle 62 is still bent at an angle relative to the body portion 64 so as to allow sufficient clearance for the handle 62 to move and rotate so as to displace the end portion 66 a sufficient extent to move the locking plate 44 out of engagement with the control element 36.

Figure 2:
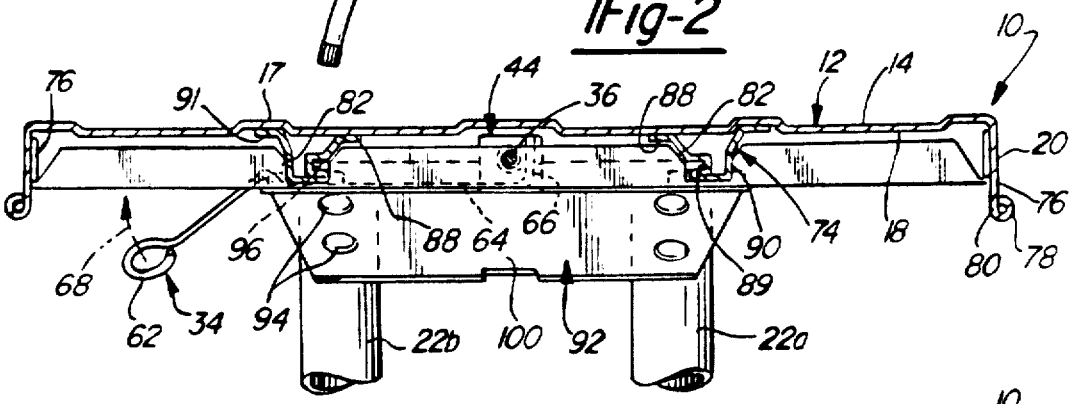
FIG. 2 is an enlarged cross sectional view taken substantially along line 2—2 of FIG. 1.
Figure 4:
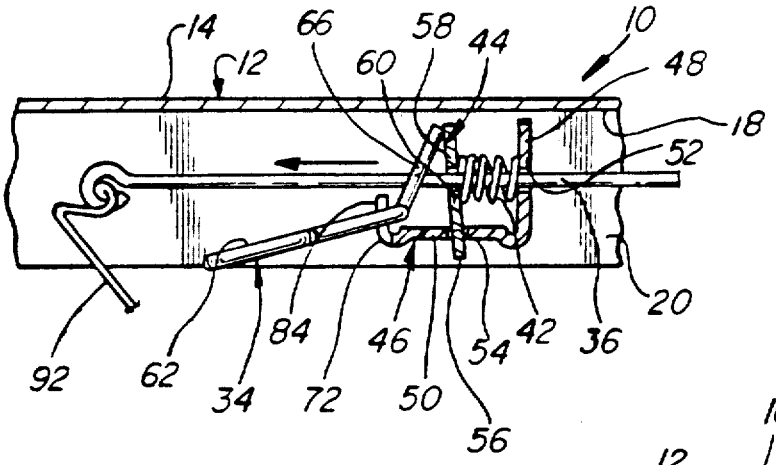
FIG. 4 is a cross sectional view showing the locking means in the released condition.
Figure 5:
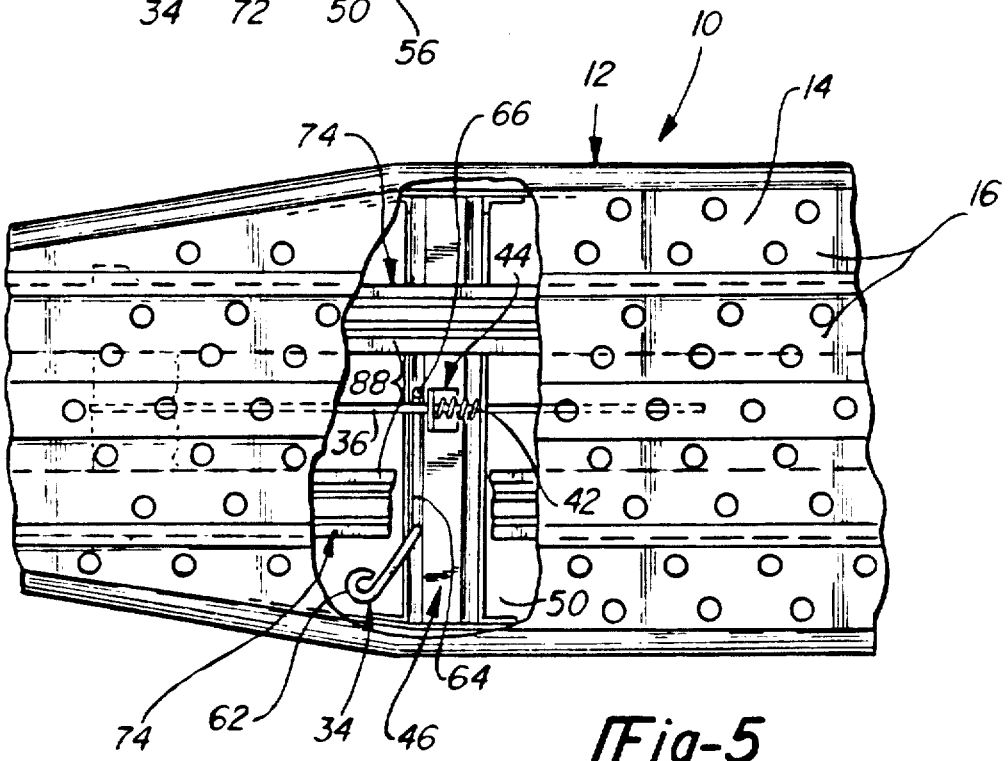
FIG. 5 is a fragmentary top plan view partially broken away of the locking means of the present invention.
Figure 6:
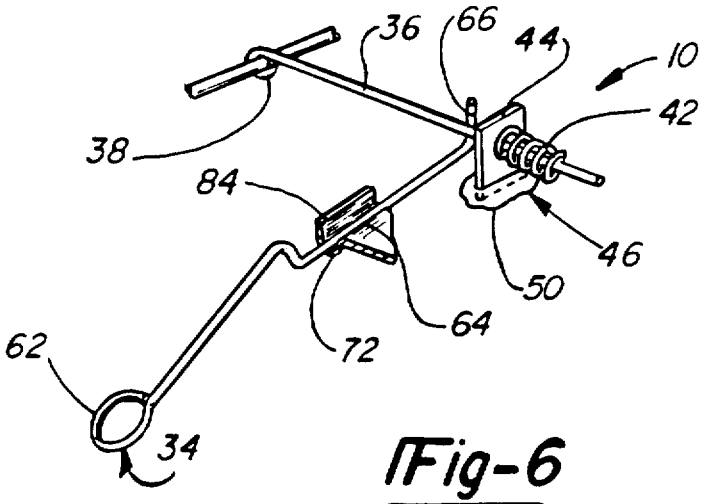
FIG. 6 is a perspective view isolating the locking means and release means of the present invention.

The housing 46 comprises an elongated housing member 46 which is substantially U-shaped when viewed in cross section, as shown in FIGS. 3 and 4. The housing member 46 has two longitudinal ends 76, each of the ends 76 being welded to the flange 20, as shown in FIG. 2. Thusly, the housing member 46 provides a rigid structure not susceptible to deflection by the operation of the release means 34.

Unlike prior art assemblies, the flange 20 includes an outwardly curled periphery 78 about the top board 12. The edge 80 of the curled periphery 78 engages the flange 20 to define a closed outward curl when viewed in cross section. The flange 20 thereby presents no outer edge, but rather the outwardly curved and smooth surface of the curl 78. As discussed in detail below, the outward curl 78 allows for the use of the natural flow of the metal material during the manufacturing process.

The housing member 46 includes rail engagement means for preventing the guide rails 74 from separating away from each other and unintentionally releasing the first leg 22. More specifically, the guide rail engagement means includes a pair of spaced recesses 82, as shown in FIG. 2, in the vertical wall 48. Each of the guide rails 74 is seated in a respective one of the recesses 82. The vertical wall 48 engages each of the guide rails 74 about the recesses 82 thereby reinforcing the positioning of the guide rails 74.

The housing member 46 includes abutment means for butting against the first leg 22 when the first leg 22 is moved completely to the open position. More specifically, the abutment means includes a second vertical wall 84 of the housing 46 which is spaced from and substantially parallel to the first vertical wall 48. The second vertical wall 84 includes a pair of spaced recesses, the guide rails 74 being seated in the recesses. The second vertical wall 84 engages the guide rails 74 about the recesses to further provide structural rigidity to the assembly.

As previously stated, the top board 12 includes flat stretched portions 16 in embosses which extend the length of the top board 12. The areas 17 between the stretched portions 16 are also flat areas as explained in more detail below with regard to the subject inventive method. The guide rails 74 are secured directly to the flat stretched portions 16 and intermediate areas 17. More specifically, each of the guide rails 74 includes a guide track and mounting flanges 88 and 91. The mounting flanges 88 are each secured to one of the stretched portions 16. The flanges 91 are secured to the area 17. For example, the mounting flanges 88 may be spot welded to the stretched portion 16.

The pattern of the stretched surfaces on the top surface 14 of the top board 12 serves to strengthen the board down its length. It also eliminates a manufacturing problem known as oilcanning. This condition is carried over to the board from the coil stock as areas of slack material that show high and low spots of different sizings appear during the forming of the top board 12. By stretching the surface at areas where the elongated guide rails 74 are to be connected, the slack is pulled out of the material thereby eliminating the majority of the problem. Thusly, a flat surface is presented to the guide rails 74 for welding while a less expensive material which possibly oil-cans may be utilized. This reduces the cost of the final product while merely requiring a pressing step as described below.

Each of the guide rails 74 has an outside wall 90 opposite to the tracks 89. The first leg 22 includes a first base portion 92 comprising a plate member. The leg 22 is secured to the plate member 92 by fastening rivets 94. The base member 92 is connected to the control element 36 by the hooked portion 38 of the control element 36.

The first base member 92 is substantially L-shaped and includes a first substantially flat portion 100 extending in a direction parallel relative to the length of the first leg 22 and a second portion 102 perpendicular relative to the first portion 100. The second portion 102 includes the axle portions 96 extending therefrom. Arms 98 are spaced from the second portion 102 thereby providing spaces for the containment of the guide rails 74.

The axle portions 96 are disposed in each of the tracks 89 for passive sliding movement towards the housing member 46 and sliding movement away from the housing member 46 when the release means 34 releases the plate member 44 from engagement with the control element 36. The base member 92 includes four point containment means for engaging the guide rails 74 within each of the tracks 89 and against each of the outside walls 90 when the legs 22, 24 are in the collapsed position. More specifically, each of the tracks 89 is substantially C-shaped having two legs and an intermediate portion therebetween. The four point containment means includes the axle portions 96 of the first base 92 which are in sliding engagement with one of the intermediate portions and arms 98 extending from the base member 92 engaging the outer walls 90 of the guide rails 74. As shown in FIG. 11, the arms 98 extend from the base member 92 at an acute angle relative to the length of the first leg 22 whereby the arms 98 engage the outer walls 90 when the first leg 22 is in the collapsed position (hatched lines) and disengage the outer wall 90 when the first leg 22 is in the open position (solid lines). This configuration allows the base member 92 to be inserted on the guide rails 74 during assembly as the arms 98. In the collapsed position, however, there is a four point engagement of the guide rails 74 by each of the axles 96 and arms 98. Any force from a blow is dissipated through both guide rails 74, as opposed through a single guide rail as in prior art constructions by the axles 96 and arms 98. This configuration has effectively eliminated the disengagement problem.

The second legs 24a and 24b include a second base member 104 and are secured thereto by rivet connections 106. The second base member 104 is connected to the undersurface 18 of the top board 12 by a second housing 108. The second base member 104 is pivotally connected to the second housing 108.

The second housing 108 includes a pair of spaced channels 110, the second base member 104 including a pair of axles 112, 122 seated in the channels 110. The second housing 108 includes a pair of recessed portions 114,116 defining the pair of channels 110. One of the recessed portions 116 includes a pair of spaced slots defining two spaced bands 124,126. The bands 124,126 extend over the channel. The band 124 is located between the second of the bands 126 and the remainder of the housing 116.

As shown in FIG. 8, the first band 124 is crimped so as to be disposed in the channel 110 so that one of the axles 122 has an end abutting against the first band 124 within the channel 110. The second base member 104 abuts against the other of the recessed portions 114.

The second base member 104 is substantially L-shaped and includes a first substantially flat portion 128 extending parallel relative to the length of the second leg 24 and a second portion 130 extending perpendicularly from the first portion 128. The second portion 130 includes the axle portions 112, 122 extending therefrom. The second portion 130 has a first side edge 132 spaced from the recessed portion 116 which includes the bands 124,126 and a second side edge 134 abutting against the other recessed portion 108. Thusly, the rear housing 108 forms half of the hinge portion, the front housing 46 forming the other half. In comparison to prior art assemblies, the rear housing 108 has been streamlined and modified to give a more positive containment of the axles 112. This positive containment is accomplished by the crimped band 124 and the engagement of the side edge by the recessed portion 114.

The present invention further provides a method of making the ironing board 10 as illustrated in FIGS. 12–15.

Figure 12:
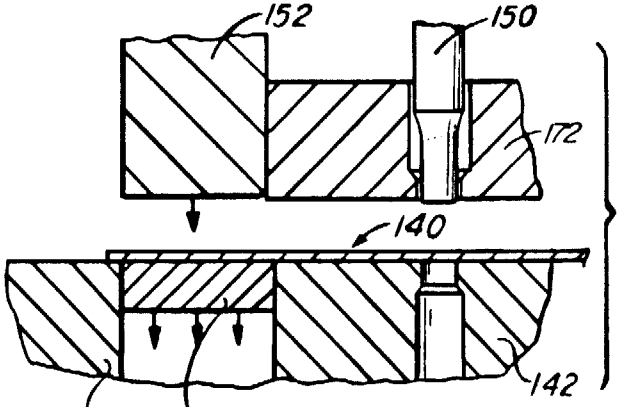
FIGS. 12 is a schematic representation of a piece of sheet metal disposed for the first die operation of the present invention wherein the die is at the top of the stroke.

The method generally includes the steps of pressing a sheet of metal [general] *generally* indicated at 140 in FIG. 12 downwardly over a stationary lower form die 142 and forming the top board 12 and flange 20 thereabout with an outwardly curved edge 148 of the flange 20.

Figure 13:
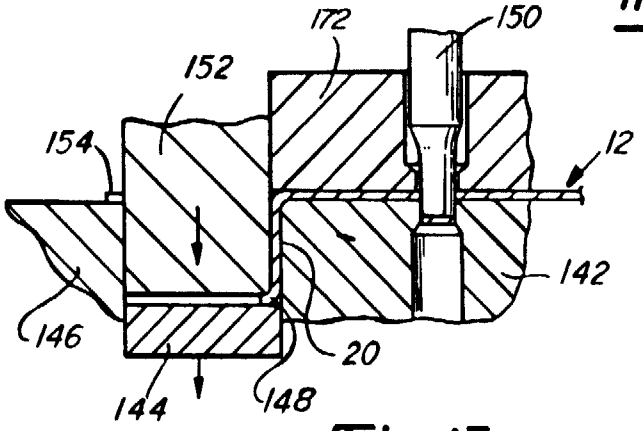
FIG. 13 shows the die from FIG. 12 at the bottom of the stroke.

More specifically, the subject method includes two die operations. In the first die operation, shown in FIG. 12 with the die at the top of its stroke, the metal sheet 140 is disposed over the stationary lower die form 142, a spring loaded pressure pad 144 and a stationary lower cutting die 146. The pressing die includes a pressure pad [148] *172*, hole piercing punch 150, and a stationary upper cutting punch 152. As shown in FIG. 13 wherein the upper die is at the bottom of its stroke, the stationary upper cutting punch forms the downwardly extending flange 20 and cuts the material 140 to naturally form the outwardly curved edge 148 of the flange 20. Scrap metal 154 remains on the lower cutting die 146. The remaining metal is formed into the flange [120]*20*. During the stroke, the hole piercing punch 150 punches holes in the top board 12. The formed top board 12 is then moved to a second die operation to curl the edge 148 and form the stretch portions 16.

Figure 14:
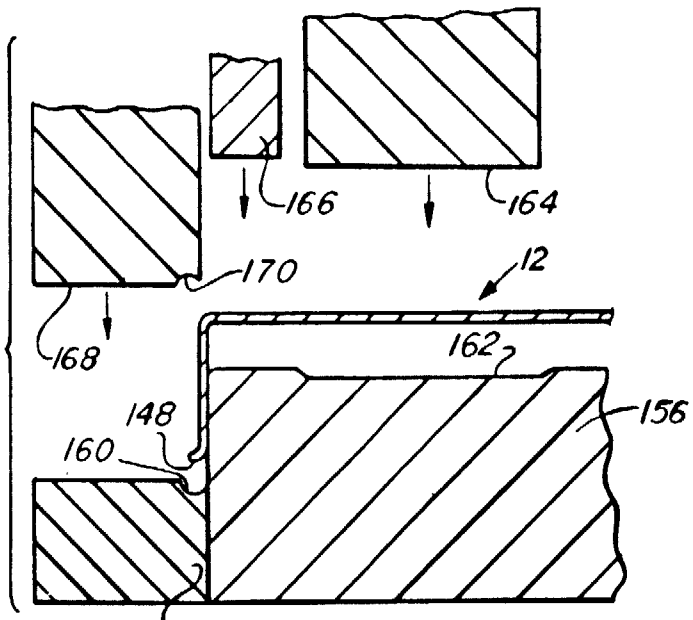
FIG. 14 shows the formed sheet metal from the die in FIGS. 12 and 13 in a second die operation wherein the die is at the top of the stroke.
Figure 15:
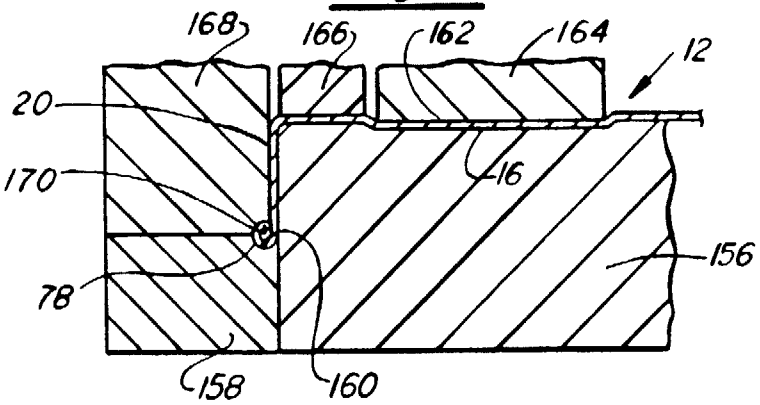
FIG. 15 shows the formed metal at the second die operation wherein the die is at the bottom of the stroke.

As shown in FIG. 14 wherein the dies are at the top of the stroke, the formed top board 12 is disposed over a lower form die 156 and a lower form die 158 having a curved form 160 therein. The lower form die 156 includes an emboss 162 therein. The upper die includes an upper form punch 164, an upper form punch 166, and a spring loaded form punch 168 including a curved form 170 therein. As shown in FIG. 15, when the upper punches 164,166,168 are lowered, the upper form punch 164 stretches the top board 12 to form the stretched portion 16 in the emboss 162. The upper form punch 166, in combination with the upper form punch 164, forces the flange 20 through the space between the spring loaded form punch 168 and the lower form die 156 thereby pressing the outwardly curved edge 148 of the flange 20 into the curved form 160 and the lower form die 158 to upwardly curl the curved edge 148. The upwardly curled edge 148 is further pressed into the curved form 170 of the spring loaded form punch 168 to curl the edge into the flange 20. This is accomplished by the downward pressing of the formed top board 12 by upper form punches 164,168 force the form flange 20 downwardly through the space between the spring loaded form punch 168 and the lower form die 156 to force the formed flange 20 into the curved forms 160,170 of the dies 158,168. The spring loaded form punch 168 and the lower form die 156 contain the flange 20 as it is forced downwardly by the upper form punches 164,166.

The two die operations initially form the curved edge 148 having a curl of approximately 75° while simultaneously trimming, piercing, and drawing the material 140. The second operation stretches the material while simultaneously rotating and the curling the edge 148 of the flange 20 to form the closed outwardly curved curl 78. Hence, the entire operation requires only two steps to form the top board 12.

The method further includes the steps of stretching portions of the metal 140 along its length forming the flattened strips 16 of metal along the length of the top board 12. The pressed top board 12 is then moved to a second operation where the guide rails 74 and housings 46,108 are welded together into a unitary frame. The unitary frame is secured to the top board 12 as the guide rails 74 are welded to the flattened strips 16.

The top board 12 is then moved to another station where the first leg 22 is mounted between the guide rails 74 for sliding movement therealong and the second leg 24 is fixedly secured to the top board 12 for pivoting movement relative thereto. The first axle 122 extending from the second base portion 104 of the second leg 24 is inserted into the first recessed portion 116 of the second housing 108 mounted on the top board 12. The second axle 112 is then slid into the oppositely facing second recessed portion 118 until the edge 134 of the base portion 104 engages the edge of the recessed portion 118. The first band 124 is crimped to abut against the end of the axle 122 thereby operatively connecting the second base portion 104 of the second leg 24 to the top board 12.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A method of making an ironing board (10) including the steps of: pressing a sheet of metal (140) [downwardly] *in a first direction* over a *first* die (142) and forming a top board (12) and flange (20) [thereabout] *extending in the first direction from the top board* with an edge (148) of the flange (20) curved *outwardly* away from the top board (12); cutting the metal (140) about the edge (148); and [curling the edge (148) of the flange (20) outwardly into the flange (20) by forming a curled and closed portion (78) curled away from the top board (12) when said flange (20) is viewed in cross section.] *pressing the outwardly curved edge (148) of the flange (20) into a curved form (160) in a second die (158) in a second direction further outwardly curling the curved edge (148) and pressing the outwardly curling edge (148) with a third die (168) in a direction towards the board inwardly curling the edge into engagement with the flange (20).*

[2. A method as set forth in claim 1 wherein said curling step is further defined as pressing the outwardly curved edge (148) of the flange e(20) into a curved form (160) in a die (158) to upwardly curl the curved edge (148) and pressing the upwardly curled edge (148) further into a curved form (170) in a second die (168) to curl the edge into the flange (20).]

3. A method as set forth in claim 1 wherein said pressing steps are further defined as downwardly pressing the formed top board (12) to force the formed flange (20) into the curved [forms] *form* (160].170) of the [dies]*die* (158[.168) *to upwardly curl the edge and further pressing the board (12) to force the curled edge into a second die (168) to form the curled closed portion.*

4. A method as set forth in claim 1 further including the step of stretching portions of the metal (140) to form flattened strips (16) of metal along the length of the board (12).

5. A method as set forth in claim 4 further including the step of securing guide rails (74) to the flattened strips (16).

6. A method as set forth in claim 5 where the step of securing is further defined as welding a flange (89) of the guide rails (74) to spaced strips (16) of the flattened metal.

7. A method as set forth in claim 5 further including the steps of mounting a first leg (22) between the guide rails (74) for sliding movement therealong and fixedly securing a second leg (24) to the top board (12) for pivoting movement relative thereto.

8. A method as set forth in claim 7 wherein the step of securing the second leg (24) is further defined by the steps of inserting a first axle portion (122) extending from the second base portion (104) of a second leg (24) into a first recessed portion (116) of a second housing (108) mounted on the top board, sliding a second axle portion (112) of the second leg (24) into an oppositely facing second recessed portion (114) until a base portion (104) of the second leg (24) engages an edge of the recessed portion (114), and crimping a portion (124) of the first recessed portion (116) to abut against an end of the first axle portion (122) thereby operatively connecting the second base portion (104) of the second leg (24) to the top board (12).

9. A method of making an ironing board including the steps of forming a top board (12); connecting a first leg (22) to the top board (12); and inserting a first axle portion (122) extending from a base portion (104) of a second leg (24) into a first recessed portion (116) of a second housing (108) mounted on the top board, sliding a second axle portion (112) of the second leg (24) into an oppositely facing second recessed portion (114) until a base portion (104) of the second leg (24) engages an edge of the recessed portion (114), and crimping a portion (124) of the first recessed portion (116) to [Abut] *abut* against an end of the first axle portion (122) thereby operatively connecting the second base portion (104) of the second leg (24) to the top board (12).

10. A method as set forth in claim 9 wherein one of the recessed portions (116) in the housing (108) includes a pair of spaced slots (120) defining two band (124.126) over a channel (110) for receiving one of the axle portions (122), said crimping step being further defined as crimping the band portion (124) disposed between the band (126) adjacent to base portion (104) of the second leg (24) and the remainder of the housing (116).

* * * * *